March 22, 1927.

A. COUCHMAN ET AL 1,622,026

LUBRICATOR

Filed March 12, 1926

Inventors
Archie Couchman
Walter L. Phillips

By Gerald F. Baldwin
Attorney

Patented Mar. 22, 1927.

1,622,026

UNITED STATES PATENT OFFICE.

ARCHIE COUCHMAN AND WALTER L. PHILLIPS, OF DETROIT, MICHIGAN, ASSIGNORS OF ONE-THIRD TO LOUIS F. DRINKHAHN, OF DETROIT, MICHIGAN.

LUBRICATOR.

Application filed March 12, 1926. Serial No. 94,107.

It is an object of this invention to provide a lubricator having a piston in the lubricant container which is gradually moved forward through gearing to expel the lubricant and wherein quick and simple means are provided for returning the piston to the opposite end of the container after the lubricant has been discharged.

Another object of the invention is to provide a lubricator having means for releasing the piston rod so that continued rotation of the gearing will not move the piston any further forward after it reaches a predetermined position in proximity to the discharge end of the lubricator.

With these and other objects in view which will be mentioned as the specification proceeds, the invention is hereinafter more fully described with the aid of the accompanying drawings.

Figure 1:
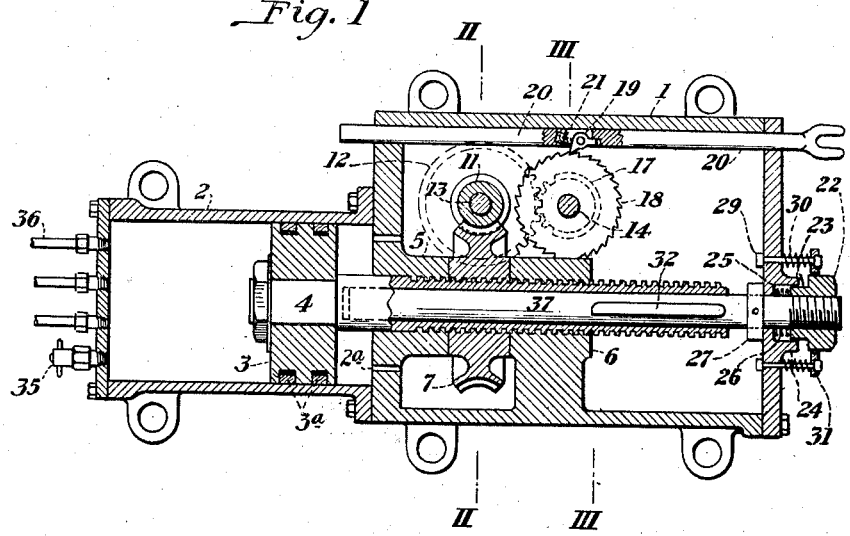

Figure 1 illustrates a cross section of the lubricator.

Figure 3:
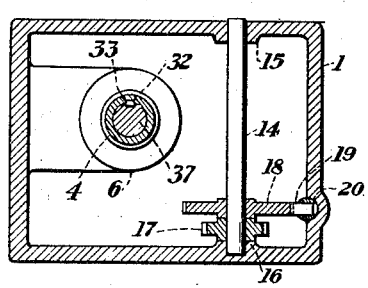
Figure 2:
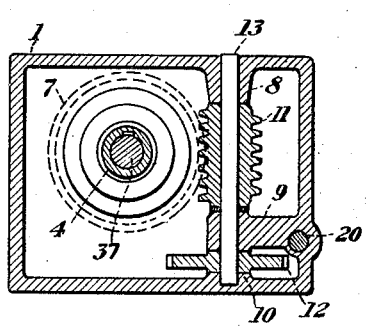

Figures 2 and 3 are sections on the lines 2—2 and 3—3 respectively of Figure 1.

Figure 4:
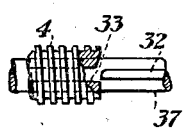
Figure 5:
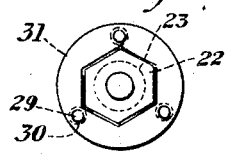

Figures 4 and 5 are details.

Referring more particularly to the drawings, 1 designates a casing having a container 2 mounted thereon. In the container is a piston 3 which is either integral with or attached to the piston rod 4. The latter is hollow for the major portion of its length and threaded externally. Bearings 5 and 6, which support the piston rod, are generally made integral with the casing 1. A worm wheel 7 positioned between these bearings has an internal thread which cooperates with the piston rod thread. Between the bearings 8, 9 and 10 all of which are integral with the casing, a worm 11 and a gear 12 are arranged, both the worm and gear being fixed on the shaft 13. A second shaft 14 mounted between the bosses 15 and 16 of the casing has a pinion 17 fixed thereon which meshes with the gear 12, and a ratchet wheel 18 which is operated by a dog 19. The latter is pivotally mounted on a rod 20 slidably positioned in the casing, and is normally held against the ratchet teeth as by a spring 21.

In the piston rod 4 a guide 37 is arranged which is slidably mounted in the boss 24 of the casing. On the outer end of the guide is a nut 22 having an annular portion 23 which extends partly into the counterbore 25 of the boss. The spring 26 around the guide 37 and in the counterbore 25 tends to force the nut 22 and guide 37 away from the piston rod, so that the collar 27 bears against the inner surface of the casing. 29 indicates pins which project outwards from the casing and have coil springs 30 around them to force the locking member 31 outwards and in engagement with the sides of the nut.

The key 32 in the guide is adapted to engage a keyway 33 in the bore of the piston rod. This key is of such length that the piston rod is prevented from turning until it has travelled forward to a predetermined point, when this occurs the piston rod reaches the end of the key and commences to rotate with the worm wheel 7. Figure 4 illustrates the end of the key just out of engagement with the keyway 33.

When it is desired to move the piston back to the rear end of the container a wrench, preferably a box wrench, is placed over the nut 22, the locking member 31 is pushed inwards off the nut, and the latter and the guide are rotated after having been pushed inwards against the tension of the spring 26. The longitudinal movement of the shaft causes the key 32 to enter the end of the keyway 33, and the worm wheel acts as a fixed nut through which the piston rod is screwed until it reaches the closed end of the container. For the arrangement of the worm drive precludes any possibility of the gearing rotating when the guide and piston rod are being screwed back through the threaded worm wheel. The guide, piston rod, and nut rotate with the worm, when the gearing again commences to function, until the sides of the nut are in alignment with the inner faces of the locking member. When this occurs the springs 30 force the locking member back onto the nut, and hold it and the guide and piston rod against further rotation.

The piston is preferably provided with rings 3ª and the rear wall of the container has openings 2ª therethrough so that any lubricant which passes to the back of the piston may be forced out through these openings when the piston is drawn back to recharge the container. Moreover the lubricant thus forced out lubricates the gearing in the casing 1.

It will be noted that the construction is such that the container is filled from the front through an opening 35, obviously this opening may be provided at any desired point. For some classes of work a plurality of discharge openings 36 are required though only one such opening may be employed if preferred.

While in the foregoing the preferred embodiment of the invention has been described and shown, it is understood that the construction is susceptible to such modifications as fall within the scope of the appended claims.

What we claim as our invention and desire to secure by Letters Patent is:

1. In a lubricator, the combination of a container having filler and discharge openings, a casing to which said container is attached, a piston in said container, a hollow externally threaded piston rod extending from said piston into said casing, an internally threaded gear cooperating with said threaded piston rod, means for rotating said gear, a guide extending inwardly from said casing and supporting said piston rod, said guide being permitted limited axial movement through said casing, spring tension means tending to hold said guide back from the piston end of said rod, and a key taking into said guide and said piston rod of such length that the latter is free to rotate on said guide when the piston reaches a predetermined position in said container.

2. In a lubricator, the combination of a container having filler and discharge openings, a casing to which said container is attached, a piston in said container, a hollow externally threaded piston rod extending from said piston into said casing, an internally threaded gear cooperating with said threaded piston rod, means for rotating said gear, a guide extending inwardly from said casing and supporting said piston rod, a key taking into said guide and said piston rod of such length that the latter is free to rotate on said guide when the piston reaches a predetermined position in the container, and a spring actuated locking member to hold said guide against accidental rotation.

3. In a lubricator, the combination of a container having filler and discharge openings, a casing to which said container is attached, a piston in said container, a hollow externally threaded piston rod extending from said piston into said casing, an internally threaded gear cooperating with said threaded piston rod, means for rotating said gear, a guide extending inwardly from said casing, a key in said guide adapted to engage a keyway in said piston rod, said guide being permitted axial movement through said casing so that after the piston rod has travelled forward far enough to become released from said key the guide may be pushed inwards to re-engage said piston rod keyway, and spring means for normally holding said guide back from the piston end of said rod.

ARCHIE COUCHMAN.
WALTER L. PHILLIPS.